(12) United States Patent
Mohan

(10) Patent No.: US 8,063,758 B1
(45) Date of Patent: Nov. 22, 2011

(54) ALERT DEVICE FOR DRIVERS WITH INFANTS

(76) Inventor: Dhanraj Mohan, Woodhaven, NY (US)

(*) Notice: Subject to any disclaimer, the term of this patent is extended or adjusted under 35 U.S.C. 154(b) by 385 days.

(21) Appl. No.: 12/433,837

(22) Filed: Apr. 30, 2009

(51) Int. Cl.
*B60Q 1/00* (2006.01)

(52) U.S. Cl. ........ 340/457; 340/901; 340/425.5; 340/438; 340/691.1; 340/693.1; 340/693.2; 340/693.4; 340/693.5; 340/321; 340/333

(58) Field of Classification Search .......... 340/901, 340/425.5, 426.24, 438, 691.1, 692, 693.1, 340/693.2, 693.4, 693.5, 321, 333
See application file for complete search history.

(56) References Cited

U.S. PATENT DOCUMENTS

| | | | |
|---|---|---|---|
| 6,026,340 A | 2/2000 | Corrado et al. | |
| 6,639,512 B1 | 10/2003 | Lee et al. | |
| 6,847,302 B2 | 1/2005 | Flanagan et al. | |
| 6,922,147 B1 | 7/2005 | Viksnins et al. | |
| 7,097,226 B2 | 8/2006 | Bingle et al. | |
| D528,455 S | 9/2006 | Drexler | |
| 2002/0033897 A1* | 3/2002 | Mayne et al. | 348/373 |
| 2004/0075581 A1* | 4/2004 | Staniszewski | 340/932.2 |
| 2005/0083190 A1 | 4/2005 | James | |
| 2005/0151844 A1 | 7/2005 | Chiao et al. | |
| 2006/0139182 A1* | 6/2006 | Staniszewski | 340/932.2 |
| 2007/0188349 A1* | 8/2007 | Staniszewski | 340/932.2 |

* cited by examiner

*Primary Examiner* — Daryl Pope

(57) ABSTRACT

An alert device comprising a plug adapted for insertion into a 12-volt electrical receptacle of a vehicle; a cover disposed on a second end of the plug; a microprocessor operatively connected to a vehicle power supply and to a backup power supply, when the vehicle is turned on the microprocessor is powered via the vehicle power supply; an audio controller connected to the microprocessor and to a speaker; a light component connected to the microprocessor; wherein when the vehicle is turned off an interrupt is triggered on the microprocessor and the microprocessor generates a first output command to the light component to activate the light component and generates a second output command to the audio controller to reproduce a pre-recorded message over the speaker.

3 Claims, 6 Drawing Sheets

ALERT DEVICE FOR DRIVERS WITH INFANTS

FIELD OF THE INVENTION

The present invention is directed to a device for alerting the occupants of a car that an infant is in the vehicle, more particularly to a device that is plugged into a 12-volt electrical receptacle of the vehicle and that sounds an alarm when the car is turned off so as to remind the occupants of the vehicle that the infant is on board.

BACKGROUND OF THE INVENTION

It is very common for parents or other caretakers to accidentally forget to remove a child or infant from his/her vehicle. The present invention features an alert device for alerting a driver or other occupants of a vehicle that a child or infant is on board. The alert device is designed to be plugged into an electrical receptacle in the vehicle (e.g., cigarette lighter).

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
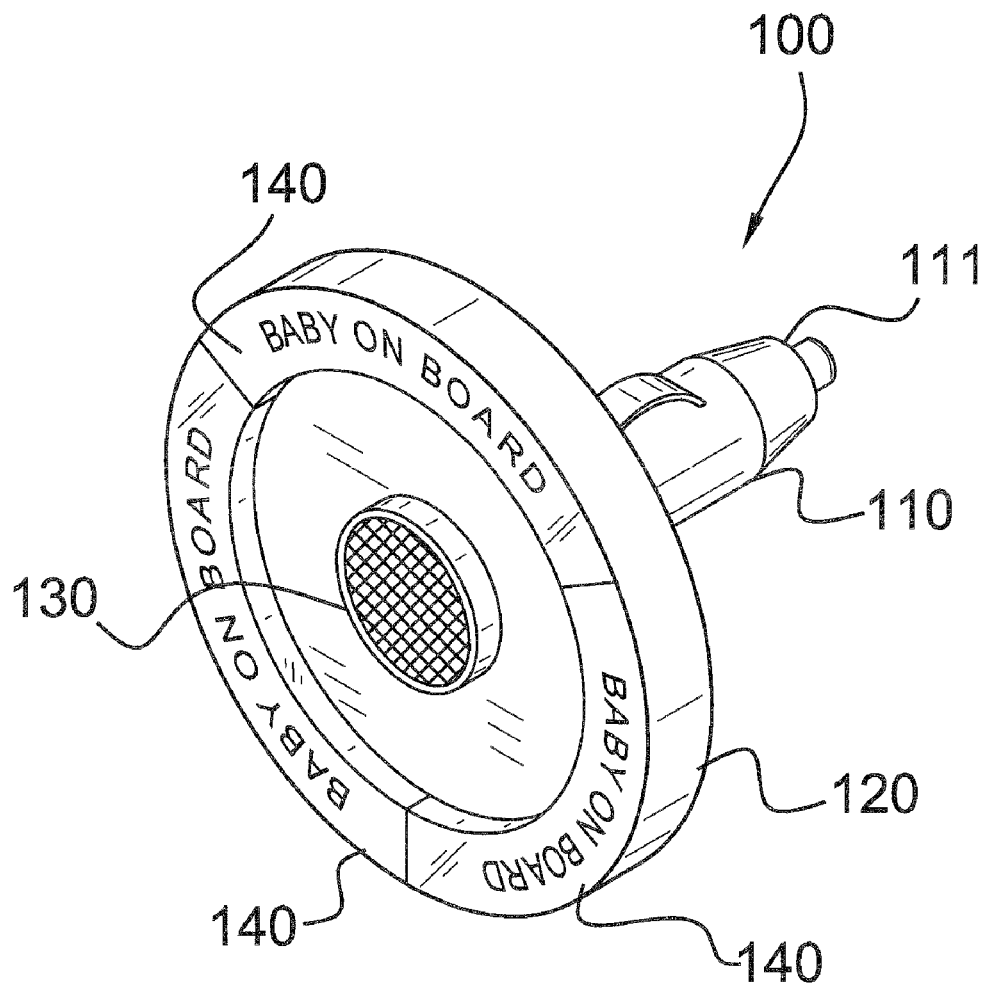
FIG. 1 is a perspective view of the alert device of the present invention.
Figure 2:
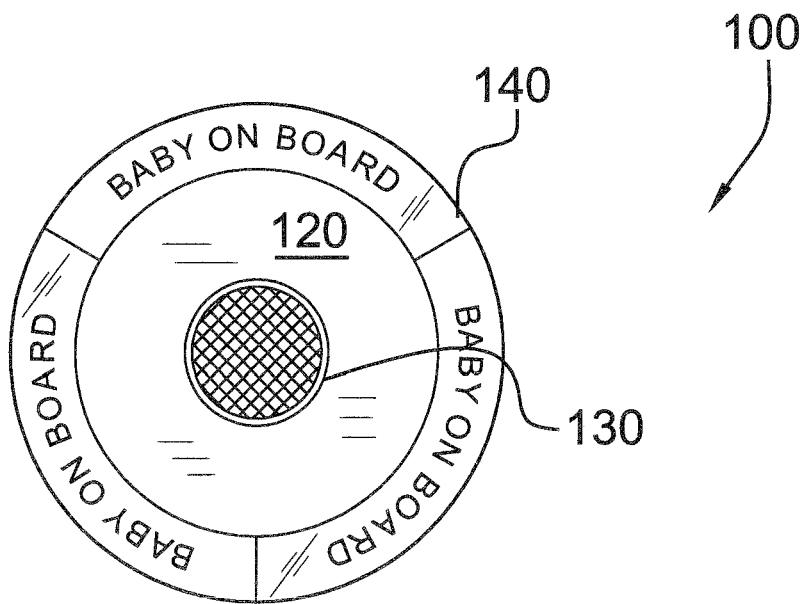
FIG. 2 is a front view of the alert device of FIG. 1.
Figure 3:
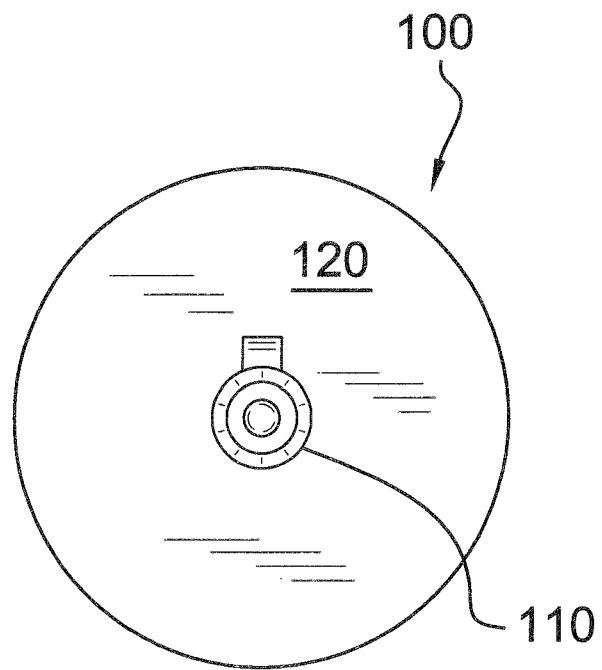
FIG. 3 is a front view of the alert device of FIG. 1.

The following is a listing of numbers corresponding to a particular element referred to herein:
100 alert device
105 power supply (e.g., 12 volt electrical system of vehicle)
110 plug
111 first end of plug
112 second end of plug
120 cover
130 speaker
135 audio controller
140 light component (e.g., LED)
145 light component driver
150 voltage regulator
160 microprocessor
170 backup power supply
175 charging circuit
180 reset button
195 power switch Referring now to FIG. 1-7, the present invention features a precautionary alert device 100 for alerting an occupant of a vehicle that an infant is on board. The alert device 100 is designed to be plugged into the electrical receptacle of the vehicle.

The alert device 110 comprises a plug 110 having a first end 111 and a second end 112. The first end 111 of the plug 110 is adapted for inserting into the 12-volt electrical receptacle (e.g., cigarette lighter) of a vehicle. Electrical receptacles and the components therein are well known to one of ordinary skill in the art. Disposed on the second end 112 of the plug 110 is a cover 120. In some embodiments, the cover 120 is marked with a decoration.

When inserted into the electrical receptacle, the plug 110 is operatively connected to a power supply 105, for example the 12-volt electrical system of the vehicle, via circuitry. The power supply 105 is operatively connected to a microprocessor 160. In some embodiments, a voltage regulator 150 is disposed in the plug 110 for reducing the voltage that is supplied to the microprocessor 160 (e.g., the integrated circuits of the microprocessor 160). Voltage regulators are well known to one of ordinary skill in the art.

Figure 4:
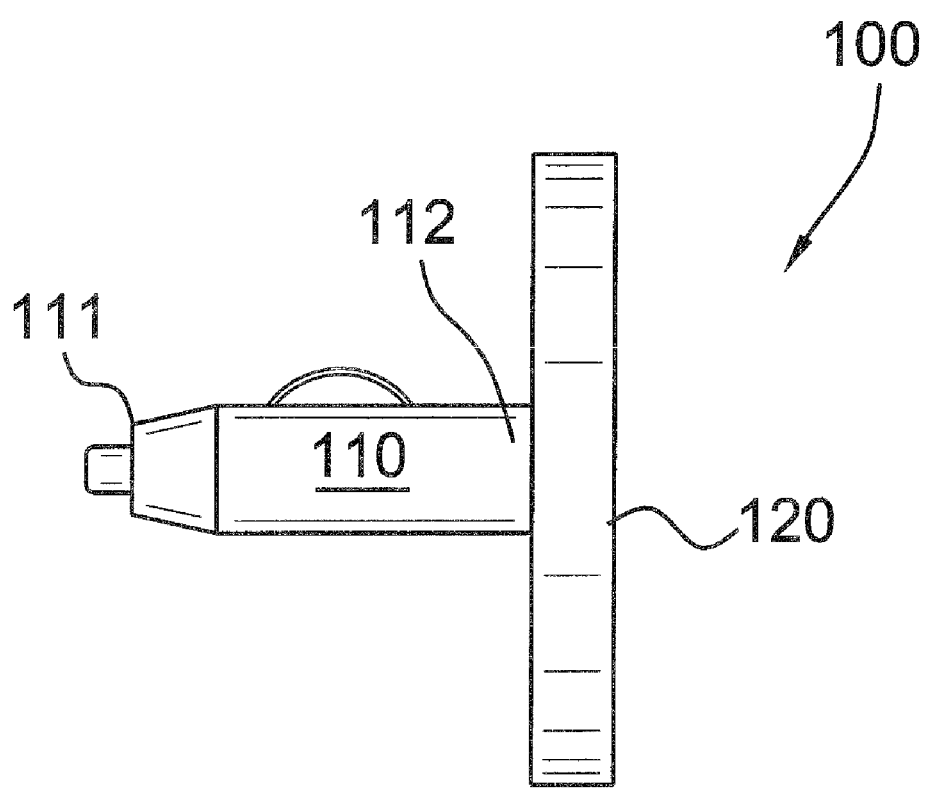
FIG. 4 is a back view of the alert device of FIG. 1.
Figure 5:
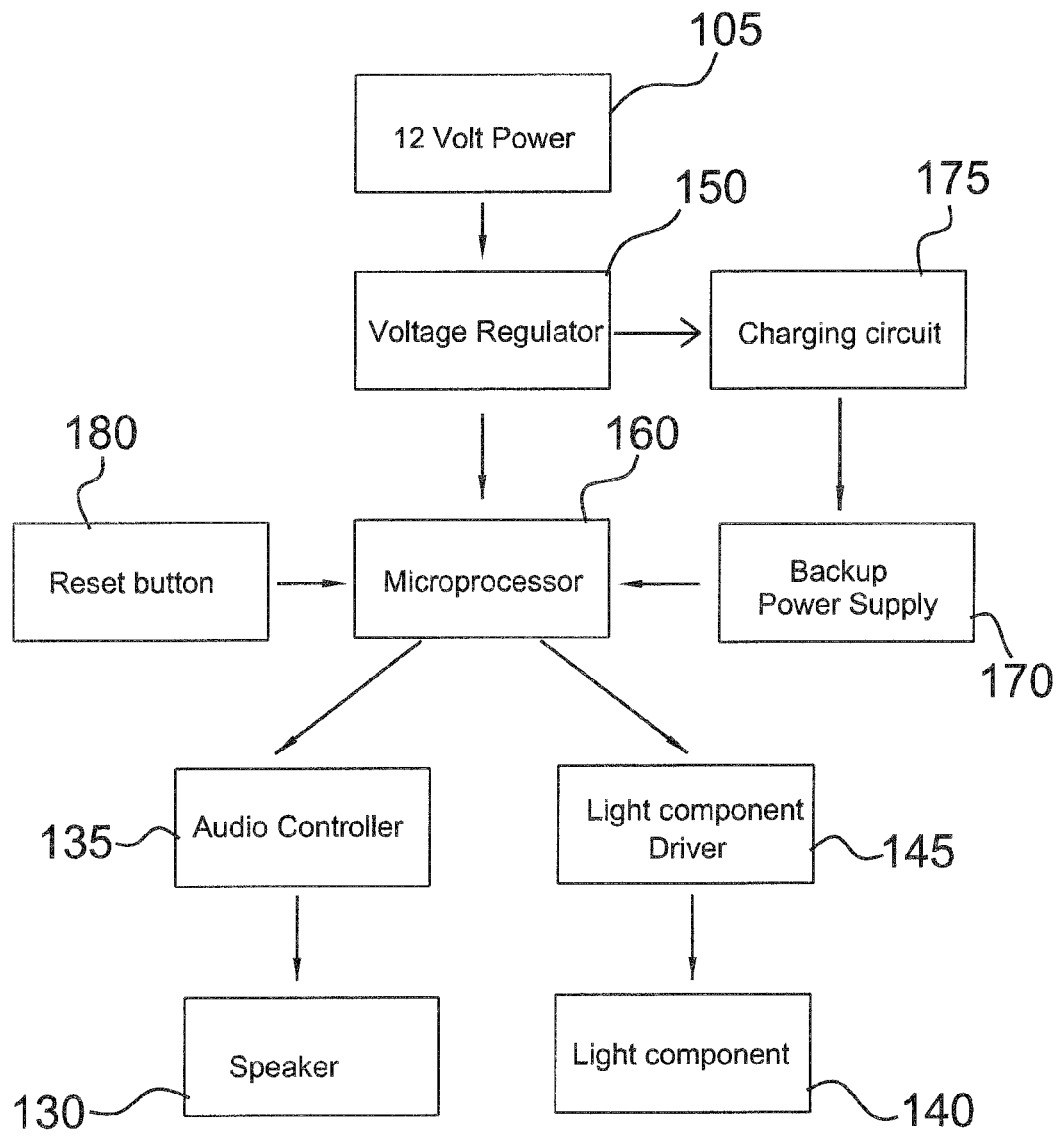
FIG. 5 is a schematic representation of the electrical system of the alert device of the present invention.
Figure 6:
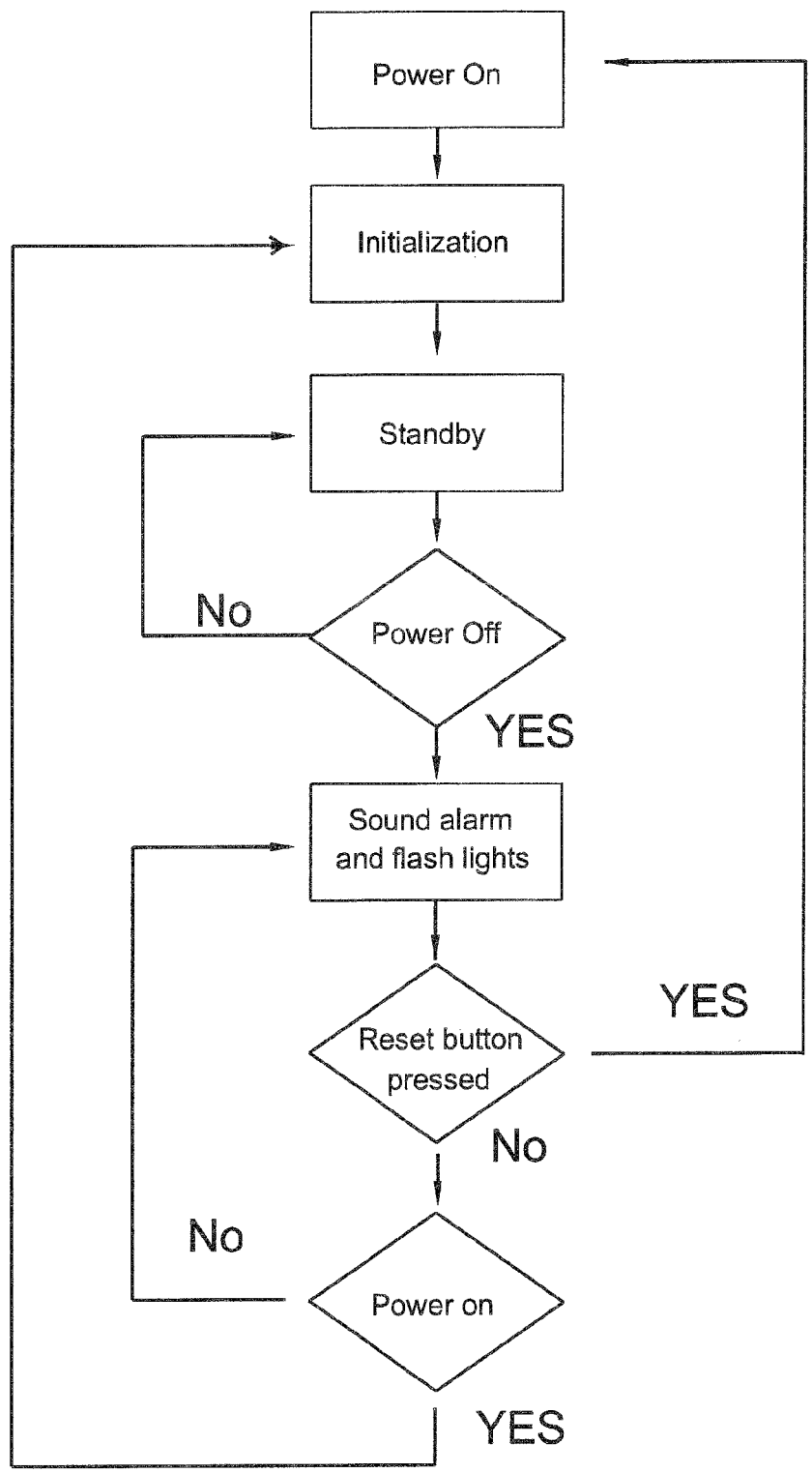
FIG. 6 is a schematic representation of the process of the alert device of the present invention.
Figure 7:
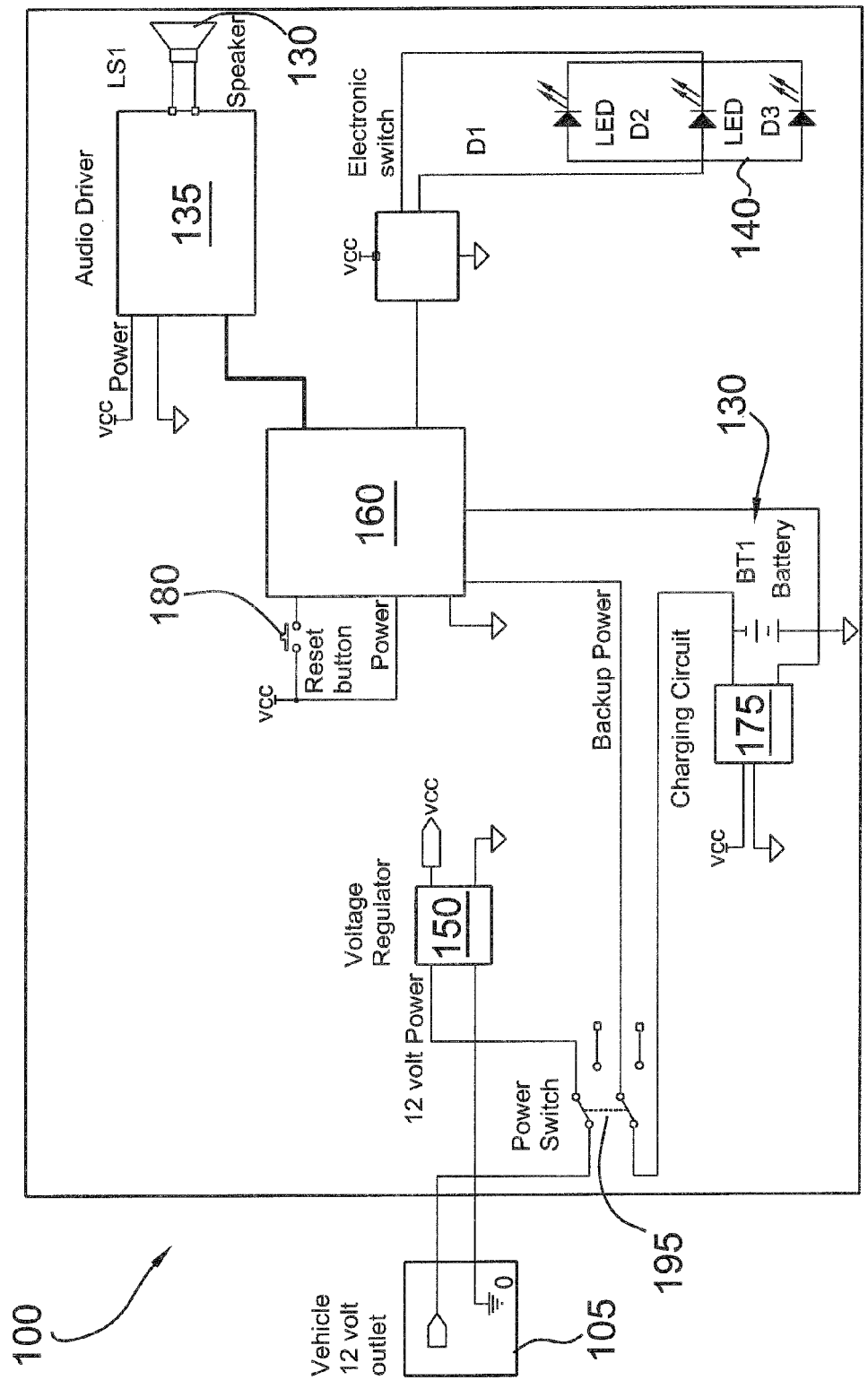
FIG. 7 is a schematic representation of the circuitry of the alert device of the present invention.

As shown in FIG. 4, power from the power supply 105 (e.g., the electrical system of the vehicle) travels through the plug 110 and optionally through the voltage regulator 150 to the microprocessor 160. In some embodiments, power from the power supply 105 and optionally the voltage regulator 150 travels to a charging circuit 175 and a backup power supply 170. The charging circuit 175 charges the backup power supply 170. The backup power supply 170 stores energy for later use by the microprocessor 160 when the microprocessor 160 no longer receives power from the power supply 105 (e.g., when the vehicle is turned off).

In some embodiments, the backup power supply is a battery (e.g., a rechargeable battery) or a capacitor, which ensures continuous operation. In some embodiments, the backup power supply is a non-rechargeable power supply.

The microprocessor 160 is operatively connected to one or more light components 140 (e.g., a light emitting diode) disposed on the cover 120 of the alert device 100. When activated, the light component 140 emits a light or a light pattern. In some embodiments, the microprocessor 160 is operatively connected to the light component 140 via a light component driver 145 that drives the light component 140.

In some embodiments, the microprocessor 160 is operatively connected to a speaker 130. The speaker 130 may be disposed on the cover 120 of the alert device 100. When activated by the microprocessor 160, the speaker reproduces a pre-recorded message. In some embodiments, the message is an alarm sound, a statement (e.g., "baby on board"), the like, or a combination thereof. In some embodiments, the microprocessor 160 is operatively connected to the speaker 130 via an audio controller 135 that drives the speaker 130. The audio controller is either hardware or software integrated into the microprocessor or it may be a discreet audio processing unit.

When power from the power supply 105 is stopped (e.g., when the vehicle is turned off), the microprocessor 160 automatically receives power from the backup power supply 170. This triggers an interrupt on the microprocessor 160, which triggers the activation of the speaker 130 (e.g., reproducing the pre-recorded audio statement/alarm) and the light component 140.

In some embodiments, the alert device 100 further comprises a reset button 195 for deactivating the speaker 130 and light component 140. The reset button 195 re-initializes the circuit. The reset button 195 controls a power switch 195 that simultaneously disconnects the backup power supply 170 and the power supply 105 so as to turn off the alert device 100. In an alternative embodiment, the switch 195 may only control the backup power supply 170. The switch 195 may not necessarily be a component of the device 100. Once the reset button 195 is pushed, it triggers another interrupt that re-initializes the device 100 and allows the device 100 to enter a low power state.

In some embodiments, software with the pre-recorded audio sounds is written to the microprocessor 160. In some embodiments, the alert device 100 comprises a separate memory module that interfaces with the microprocessor 160 that contains the pre-recorded audio sounds.

EXAMPLE 1

Use of the Alert Device

The plug 110 of the alert device 100 is plugged into the 12-volt electrical receptacle of a vehicle. As the vehicle runs, the alert device 100 is in a low power standby state and the speaker 130 is not activated (nor the light component 140). When the vehicle is turned off, the power supply 105 is disconnected from the alert device 100. The alert device 100 then receives power from the backup power supply 170. Upon receipt of power from the backup power supply 170, the microprocessor 160 activates the light component 140 and the speaker 130. The audio controller 135 reproduces the pre-recorded message "baby on board" and the light component 140 emits a light. When the vehicle occupant has removed the infant from the vehicle, he/she presses the reset button to deactivate the speaker 130 and the light component 140. Alternatively, the occupant may turn the vehicle back on.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A precautionary alert device for notifying an occupant in a vehicle that an infant is on board, said alert device comprising:
   (a) a plug having a first end and a second end, wherein the first end is adapted for insertion into a 12-volt electrical receptacle of the vehicle and a cover is disposed on the second end;
   (b) a microprocessor operatively connected to both a power supply from the vehicle via the plug and to a backup power supply; wherein when the vehicle is turned on the microprocessor is powered via the power supply from the vehicle;
   (c) an audio controller operatively connected to the microprocessor and to a speaker disposed on the cover;
   (d) a light component disposed on the cover and operatively connected to the microprocessor;
   wherein when the vehicle is turned off an interrupt is triggered on the microprocessor, wherein the microprocessor is configured to
   receive a first input signal from the interrupt
   generate a first output command operatively connected to the light component such that in response to the interrupt the light component is activated;
   generate a second output command operatively connected to the audio controller such that in response to the interrupt the audio controller reproduces a pre-recorded message over the speaker.

2. The alert device of claim 1 further comprising a reset button for deactivating the speaker and the light component, wherein the reset button controls a power switch that simultaneously disconnects the backup power supply and the power supply from the vehicle.

3. The alert device of claim 1 further comprising a voltage regulator for reducing the voltage of power received by the microprocessor from the power supply of the vehicle.

* * * * *